Figure 1:
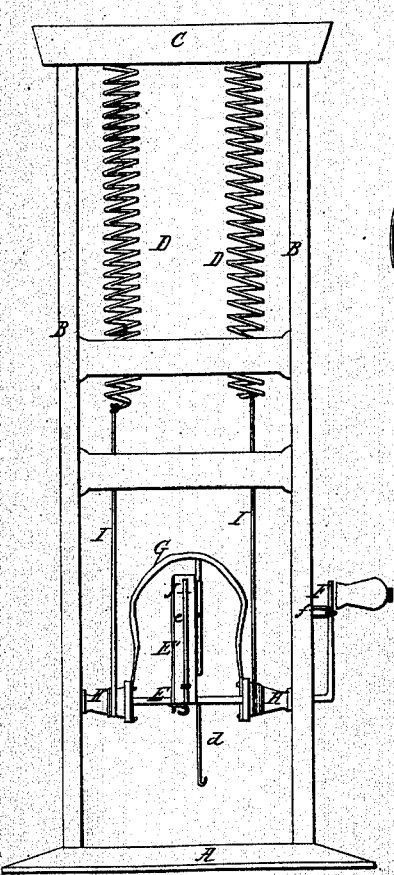

S. S. Henderson,
Rat Trap.

N°26,495. Patented Dec. 20, 1859.

Witnesses:
Chas. B. Burch
James Johnson

Inventor:
S. S. Henderson
per attorney
J. G. Clayton

UNITED STATES PATENT OFFICE.

SIMSON S. HENDERSON, OF OXFORD, OHIO.

RAT-TRAP.

Specification of Letters Patent No. 26,495, dated December 20, 1859.

*To all whom it may concern:*

Be it known that I, SIMSON S. HENDERSON, of Oxford township, in the county of Guernsey and State of Ohio, have invented a new and Improved Rat-Trap; and I do hereby declare that the following is a full and exact description thereof, reference being had to the accompanying drawings, and to the letters of reference marked thereon.

To enable others skilled in the art to make and use my invention, I will describe its construction and operation.

In the drawings similar characters refer to like parts.

Figure 2:
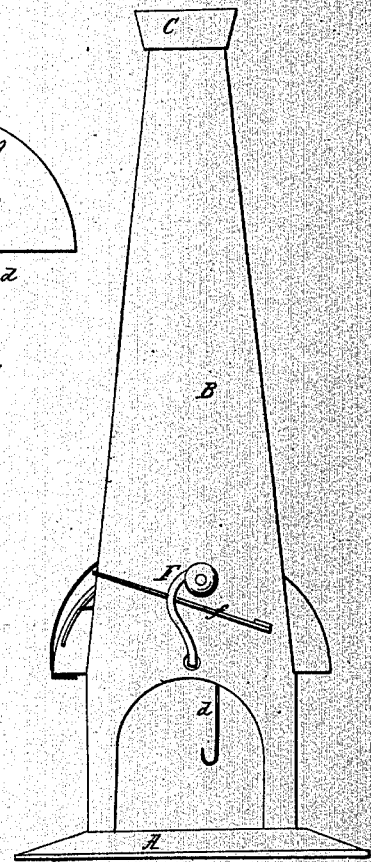

Figure 1 is a front elevation. Fig. 2 is a side elevation. Fig. 3 is a view of the triggers.

A is the base upon which the frame-work B is built. C the horizontal bar or beam connecting uprights B at the top. D, D, spiral springs suspended from cross bar C. E, a shaft having its bearings between uprights B; upon one end of this shaft is a crank F for winding up the instrument. Upon this shaft, and midway between the uprights is a heavy yoke-lever or striker G. Also upon this shaft are two conical spools H, H; a cord I extends from each spool to the spring C immediately over it.

J is the board upon which the trigger is fixed, and is immovably attached to shaft E by standard E'.

$a$ is the pivoted dog or catch which holds the striker G in a position for striking. $a'$ operating spring of dog $a$. $b$ a detent (pivoted) for holding dog $a$ in position—$b'$ a spring for holding detent $b$ in operating position. $c$ a small cam for regulating the power of spring $b'$, and thereby the ease or difficulty of the trap. $d$ the operating or bait-wire. $e$ a spring for lessening the noise made in self-setting. $f$ a spring catch on the outside of upright B for catching the crank F.

In the operation of my trap:—In the first place I put bait on bait-wire $d$, the triggers being self setting (see Fig. 3), I now take hold of the crank and wind until the springs D are almost brought down to the spools H. If now a rat pull on the bait attached to wire $d$, detent $b$ will be disengaged from dog $a$, which being freed permits striker G to fly around rapidly and strike the rat with great force, instantly killing it and throwing it out of the way. After striking, the striker continues on its course, passing over spring $e$ which deadens the noise, until it is stopped by dog $a$, when it is ready to serve the next rat which appears, and will continue to strike and set itself until the cords around the spools are entirely unwound. It is readily seen that my trap can be easily and safely managed by a mere child.

Having thus fully described the construction and operation of my invention—what I claim as new and desire to secure by Letters Patent is:—

The combination of the springs D with cone spools H, catch $a$, detent $b$, and bait wire $d$ forming the trigger, and striker G, the whole operating substantially in the manner and for the purposes set forth.

SIMSON S. HENDERSON.

Witnesses:
 T. J. ROMANS,
 THOMAS RUTH.